US005253399A

United States Patent [19]

Gloe et al.

[11] Patent Number: 5,253,399

[45] Date of Patent: Oct. 19, 1993

[54] METHOD AND APPARATUS FOR PROCESSING A PLURALITY OF WIRE LEADS

[75] Inventors: Karl-Heinz Gloe, Reichelsheim; Michael Gerst, Worms; Lothar Bauer, Wiesbaden-Nordenstadt, all of Fed. Rep. of Germany

[73] Assignee: AMP Incorporated, Harrisburg, Pa.

[21] Appl. No.: 727,720

[22] Filed: Jul. 10, 1991

[30] Foreign Application Priority Data

Jul. 20, 1990 [GB] United Kingdom ................. 9016000

[51] Int. Cl.[5] ................................................ B23P 19/00

[52] U.S. Cl. .................................. 29/33 M; 29/566.1; 29/819

[58] Field of Search ................. 29/564.1, 564.3, 564.4, 29/564.6, 564.8, 566.1, 819, 33 M; 294/115, 116

[56] References Cited

U.S. PATENT DOCUMENTS

| | | | |
|---|---|---|---|
| 3,019,678 | 2/1962 | Fiell | 80/14 |
| 3,267,556 | 8/1966 | Scharf | 29/155.55 |
| 3,479,717 | 11/1969 | Howard | 29/564.6 |
| 3,583,055 | 6/1971 | Hammond | 29/203 D |
| 3,872,584 | 3/1975 | Chick et al. | 29/630 A |
| 4,238,981 | 12/1980 | Karl | 29/564.6 |
| 4,559,702 | 12/1985 | Maack et al. | 29/759 |
| 4,780,950 | 11/1988 | Holcomb | 29/564.6 |

*Primary Examiner*—Mark Rosenbaum
*Assistant Examiner*—Kenneth J. Hansen
*Attorney, Agent, or Firm*—Bruce J. Wolstoncroft

[57] ABSTRACT

An apparatus and method for the high speed manufacture of a plurality of leads allows for the manufacture of various lengths of leads, as well as leads utilizing different wire gauges. The lead making apparatus has a plurality of wire gripping devices which are movable between an open position and a closed position. Each of the wire gripping devices has a channel which is dimensioned to allow the wire to be positioned and maintained therein. A wire feed is positioned proximate to the wire gripping devices and cooperates with the wire to advance the wire into the wire gripping devices. A drive belt is provided adjacent to the wire gripping devices and cooperates with the wire gripping devices to move the wire gripping devices. Whereby the drive belt moves the wire gripping devices in the same direction as the wire feed advances the wire, such that as the wire gripping devices are moved, the wire will be advanced into the channels of the wire gripping devices.

9 Claims, 10 Drawing Sheets

METHOD AND APPARATUS FOR PROCESSING A PLURALITY OF WIRE LEADS

FIELD OF THE INVENTION

The invention is directed to a method and apparatus for processing a plurality of wire leads. More particularly, the invention relates to a method and apparatus capable of applying terminals or performing other work operations on both ends of respective wire leads, which may be of varying lengths and diameters, at a high rate of speed.

BACKGROUND OF THE INVENTION

Various machines are well known in the prior art for processing wire leads wherein terminals are applied to one or both ends of wire leads. One such apparatus is shown in U.S. Pat. No. 3,019,678 issued to Schwalm et al. on Feb. 6, 1962. In this machine, which is known in the trade as an Ampomator automatic lead making machine, a wire lead is fed into a first transfer mechanism which presents the leading end of the wire lead (which is connected to a source of the supply) to a first terminal applicator, applies a terminal to the leading end of the wire lead, and then positions the wire lead in a second position wherein it is fed past cutting and stripping means, the wire lead fed past the cutting and stripping means being received by a second transfer means, the machine further cutting and stripping the wire lead between the end which has a terminal initially affixed thereto and its source of supply, the trailing end of the cut wire lead then being transferred to a second terminal applicator. After a terminal is applied to the trailing end the wire lead is then discarded from the machine. The machine shown in the patent is capable of processing only a single wire. A commercial variation of the machine shown in the Patent, which is known as the Model IV-C, is capable of processing two wire leads, however, in this model both wire leads should be of substantially the same diameter. Furthermore, as the terminal applicators which apply terminals to the trailing ends of the cut wire leads are disposed in close side-by-side relationship to each other, it is not practical to perform substantially different work operations under the end of the cut wire leads, such as bending terminals, solder dipping, applying insulating sleeves, etc.

U.S. Pat. No. 3,583,055 which issued to Hammond on June 8, 1971 discloses an apparatus which measures and cuts a pair of wire leads and presents the ends of the paired wire leads sequentially to spaced apart work stations which are capable of performing varying work operations upon the trailing and leading ends of the wire leads. While the machine shown in this Patent has gained widespread commercial acceptance, it has the disadvantage in that each pair of wires is of substantially the same length and of substantially the same diameter.

The Scharf Patent (U.S. Pat. No. 3,267,556) discloses an apparatus which applies a terminal to the leading end of a wire lead which extends away from a source of supply, feeds the wire past a cutting and stripping mechanism after the terminal or the like has been applied to the leading end, and provides a conveyor mounted upon endless roller chains which conveys the trailing end of the wire lead after it has been cut past another terminal applicator. This prior art machine has the disadvantage in that it is incapable of simultaneously processing a plurality of wire leads which may be of differing diameters and lengths.

U.S. Pat. No. 3,872,584 issued Mar. 25, 1975 discloses a fully automatic apparatus which measures, cuts and strips a plurality of wire leads, which may be of differing diameters and lengths. Terminals or the like are applied to the leading ends of the wire leads, and the plurality of cut wire leads are transferred to a conveyor which subsequently indexes the trailing ends of the cut wire leads past a plurality of terminal applicators or other work performing structures to a discharge station. The conveyor has a plurality of clamp assemblies mounted on an endless chain.

U.S. Pat. No. 4,559,702 teaches of a harness making machine having an indexable conveyor with wire jigs provided thereon for holding wires in parallel relationship with the wire ends extending to one side of the conveyor. Each of the wire jigs comprises a plurality of individual wire clamps stacked against each other. The individual wire clamps can be moved from the stack to an extended position so that the wires are individually presented to the wire processing machines.

SUMMARY OF THE INVENTION

The present invention is directed to an apparatus and method for the high speed manufacture of a plurality of leads. The invention allows for the manufacture of various lengths of leads, as well as leads utilizing different wire gauges. In order to accomplish this the invention is directed to a lead making apparatus having a plurality of wire gripping devices which are movable between an open position and a closed position. Each of the wire gripping devices has a channel which is dimensioned to allow the wire to be positioned proximate to the wire gripping devices and cooperate with the wires to advance the wire into the wire gripping devices. Drive means are provided adjacent to the wire gripping devices. The drive means cooperate with the wire gripping devices to move the wire gripping devices. Whereby the drive means move the wire gripping devices in the same direction as the wire feed means advances the wire, such that as the wire gripping devices are moved, the wire will be advanced into the channels of the wire gripping devices.

The invention is also directed to a method for producing a plurality of leads from a continuous wire. The method comprising the steps of feeding the continuous wire into a feed station, while simultaneously advancing wire gripping means of a lead making apparatus. Positioning the wire in a channel of the wire gripping means. Moving the wire gripping means from an open position to a closed position, in which the wire is maintained in position relative to the wire gripping means. And, advancing each of the closed wire gripping means in a direction which is coplanar with the direction of the wire feed.

DETAILED DESCRIPTION OF THE INVENTION

Figure 1:
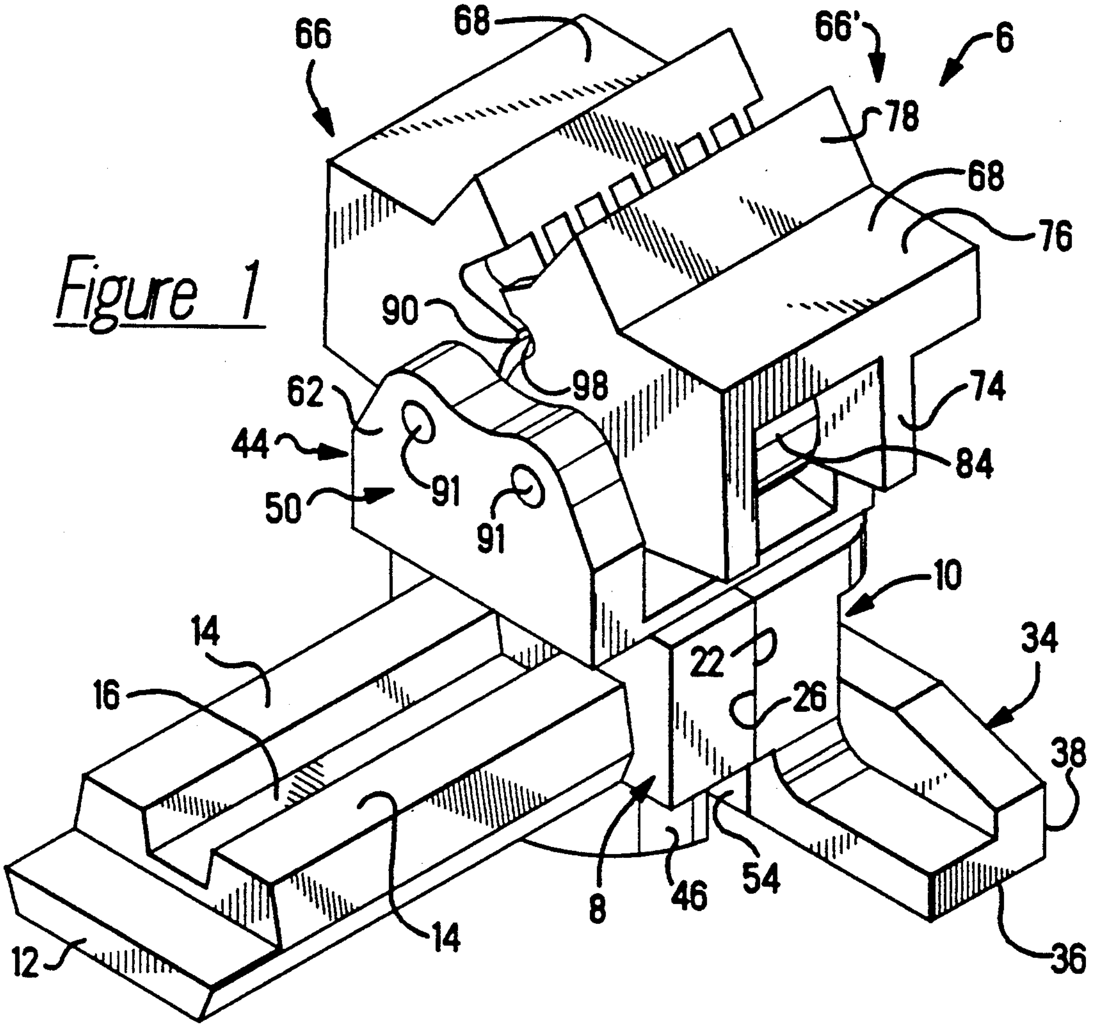
FIG. 1 is a perspective view of a top portion of a wire clamping device which is used in a lead making machine, the top portion having the wire clamping jaws provided thereon.

FIGS. 4 through 10 illustrate the wire feed and cutting portion 2 of the lead making machine and the method used to feed and manipulate wire 4 at a high rate of speed. As is shown in the figures, wire clamping devices 6 are positioned at respective intervals on the apparatus to cooperate with the wire, as will be more fully discussed. Although it is conceivable that various wire clamping devices can be used, the particular embodiment of the wire clamping device shown in the drawing will be described in detail.

Figure 2:
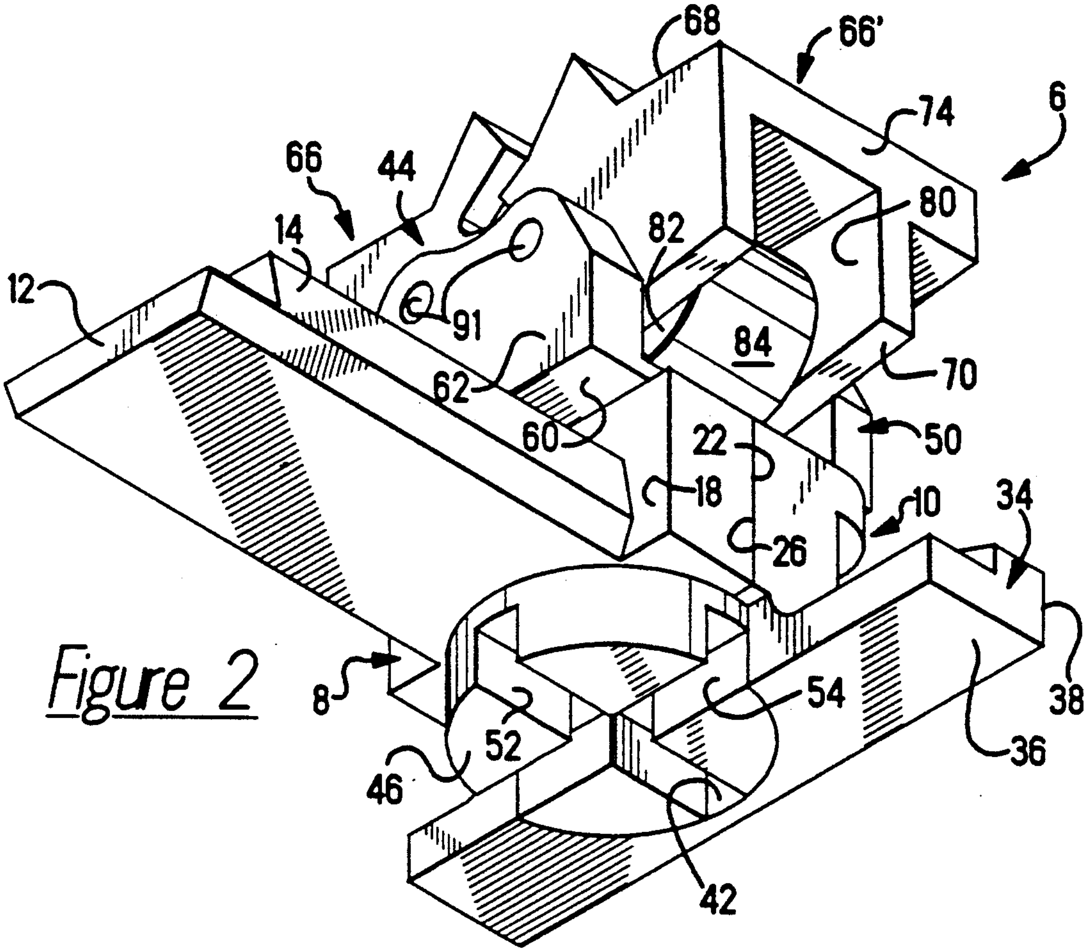
FIG. 2 is a perspective view of a bottom portion of the wire clamping device shown in FIG. 1, the bottom portion having a track following recesses provided thereon.
Figure 3:
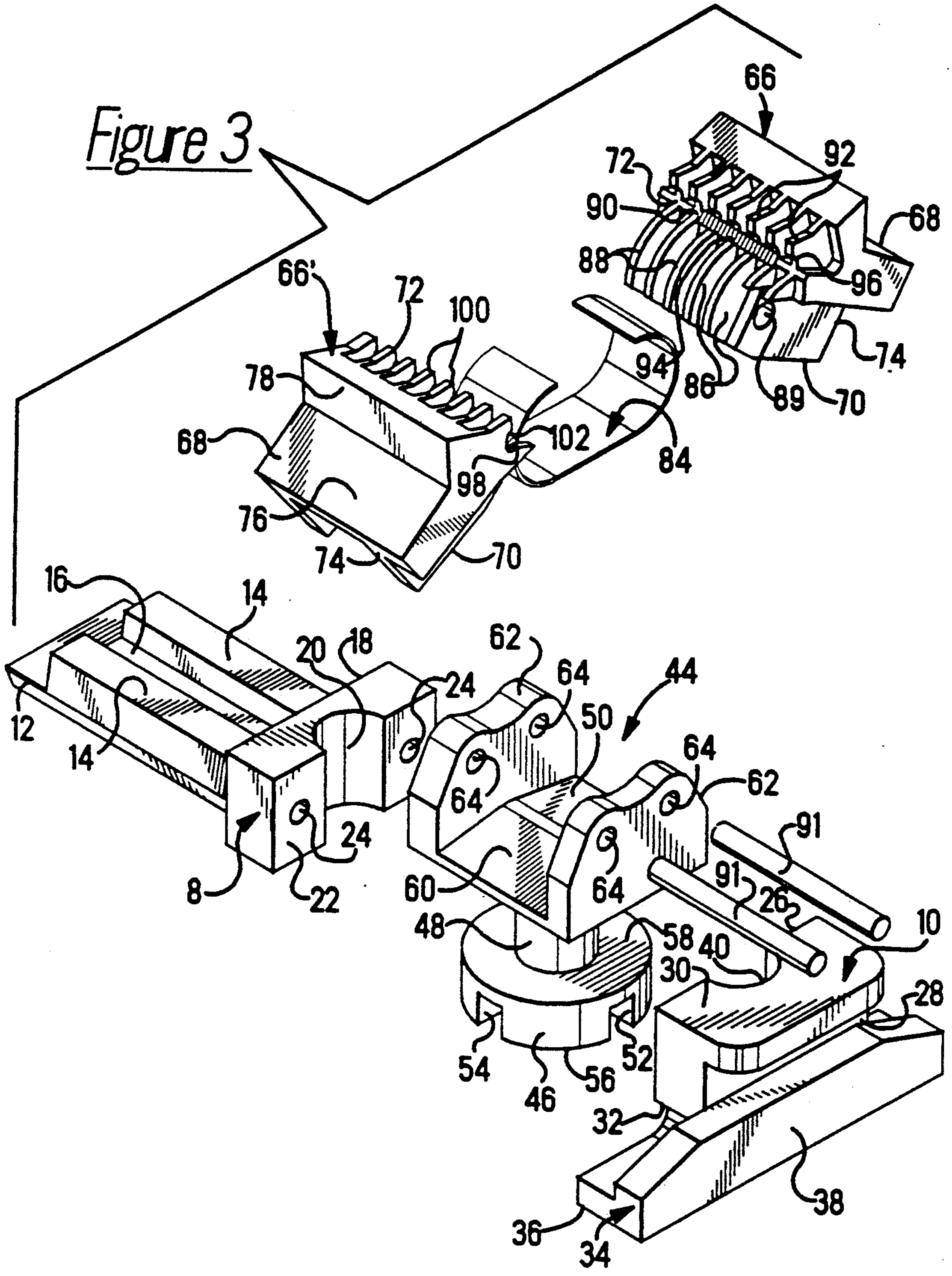
FIG. 3 is an exploded perspective view of the wire illustrated in FIG. 1, illustrating the separable wire clamping jaws and resilient member therefore.

Referring to FIGS. 1 through 3, each wire clamping device 6 has a first base member 8 and a second base member 10. As is best shown in FIG. 3, the first base member 8 has conveyor belt cooperation section 12 which extends from first side surface 18 thereof. Projections 14 are provided on section 12, the projections 14 are spaced apart, as shown in FIGS. 1 and 3 to form a recess 16. The function of the projections and recess will be more fully described below.

An arcuate recess 20 is provided on a second side surface 22 of the base member 8. The recess 20 has essentially a uniform radius over its entire length. Securing openings 24 are positioned adjacent to the recess 20. As shown in FIG. 3, respective securing openings 24 are positioned on opposed sides of the recess.

Second base member 10 has a first side surface 26, an oppositely facing second side surface 28, a top surface 30 and a bottom surface 32. Extending from the second side surface 28 and the bottom surface 32 is a guide and alignment member 34. As best shown in FIGS. 2 and 3, member 34 has a bottom surface 36 and a side surface 38, both of which cooperate with an alignment track follower of the lead making machine, as will be more fully discussed.

An arcuate recess 40 is provided on the first side surface 26 of the base member 10. The recess 40 has essentially a uniform radius over its entire length. An enlarged recess 42 (FIG. 2) is provided on member 34. The enlarged recess has an essentially uniform radius over its entire length. The centers of the recess 40 and the enlarged recess 42 are coaxial.

A rotational member 44 is provided in the circular opening formed when recess 20 and recess 40 are moved into cooperation with each other. In this position, as shown in FIGS. 1 and 2, the second side surface 22 of the base member 8 is positioned in engagement with the first side surface 26 of the base member 10. The base members 8 and 10 are secured in this position with the rotational member 44 provided in the opening.

The rotational member 44, as best viewed in FIG. 3, includes a rounded base portion 46, a rounded stem 48 which extends upward from the base portion, and a clamp holding portion 50 which extends from the stem. The rounded stem 48 has a diameter which is slightly smaller than the diameter of the opening formed by the recesses 20, 40. This allows the stem 48 to be positioned in the opening while still allowing the stem to rotate relative to the base members 8, 10.

The rounded base portion 46 has a diameter larger than the diameter of the stem 48. The diameter of the base portion 46 is slightly smaller than the diameter of the enlarged recess 42. This dimensioning of the base portion 46 and recess 42 allows the base portion 46 to rotate relative to the recess 42. However, the base portion 46 is maintained in relatively stable position by recess 42.

The base portion 46 has a first and a second track follower 52, 54 which extend from a lower surface 56 of the base portion toward an upper surface 58. The first track follower 52 is provided along a respective diameter of the base portion. The second track follower 54 is also provided along a second respective diameter of the base member, in a direction which is essentially perpendicular to the first track follower 52. As is best shown in FIG. 2, the track followers 52, 54 intersect each other at a position which is in line with the central axis of the base portion 8.

Referring back to FIG. 1, the clamp holding portion 50 is integrally attached to the stem 48, and has a bottom wall 60 and oppositely facing side walls 62. The side walls 62 extend from the bottom wall 60 in a direction which is essentially perpendicular to the bottom wall. Each side wall 62 has two openings 64 which extend through the side walls. As shown in FIG. 3, the openings 64 of one side wall are positioned in alignment with respective openings in the other side wall. The side walls 62 are spaced from each other a distance which is sufficient to allow clamping members 66, 66' to be inserted therebetween.

Each clamping member 66 or 66', as best shown in FIG. 3, has a top surface 68, a bottom surface 70, a wire cooperation surface 72, and a spring cooperation surface 74. As viewed in FIG. 1, the top surface 68 has a flat surface 76, which is essentially parallel to the bottom surface 70, and an angled surface 78, which is provided adjacent to the wire cooperation surface 72.

Referring to FIG. 2, the spring cooperation surface 74 has a spring receiving recess 80 which extends inward from the spring cooperation surface 74 and the bottom surface 70. The recess 80 has projection 82 which extends therein. The projection 82 cooperates with a spring 84 to maintain the spring in position, as will be more fully discussed.

The wire cooperation surface 72 has alignment grooves 86 positioned proximate the bottom surface 70 thereof. The dividing walls 88 which separate the grooves have rounded end surfaces, as shown in FIG. 3. The rounded end surfaces allow the clamping members 66 to move relative to each other when the wire clamping device 6 is fully assembled.

A mounting opening 89 is provided on each clamping member 66, 66'. The mounting opening 89 cooperates with mounting rods 91, as will be more fully discussed.

Wire clamping member 66, as best shown in FIG. 3, has a wire positioning surface 90 and wire hold down members 92 positioned thereon. The wire positioning surface 90 engages the wire, when the wire is inserted therein, to maintain the wire in position. Serrations 94 are provided on the surface 90 to insure that the wire is maintained in position. The wire hold down members 92 are positioned above the surface 90, proximate the top surface 68. The hold down members shown are projections which have grooves provided therebetween. The projections have surfaces 96 (FIG. 1) which are essentially parallel to the bottom surface 70, which cooperate with the wire, to prevent the wire from being removed in the direction of the top surface 68.

Wire clamping member 66', as best shown in FIGS. 1 and 3, has a wire positioning recess 98 and wire hold down members 100. The wire positioning recess 98 receives the wire therein, when the wire positioning surface 90 is moved. As best shown in FIG. 1, the recess is dimensioned to receive the wire and surface 90 therein. The wire hold down members, with surfaces 102, are essentially identical to the wire hold down members 92 and the surface 96 thereof. Therefor, the description will not be repeated.

Spring 84 is positioned proximate the bottom wall 60, as best shown in FIG. 2. The spring extends across the wire clamping members 66, 66' to provide the wire clamping members with the resiliency required for the operation of the wire clamping device 6. As shown in FIG. 3, spring 84 has a generally C-shaped configuration.

In the assembled condition, as shown in FIGS. 1 and 2, rotational member 44 is secured in the opening formed between the base members 8 and 10. In this position rotational member 44 is free to rotate about the base members, however, the rotational member is restricted from movement relative to the base members in a direction which is parallel or perpendicular to the axis of the opening.

In order to assemble the clamping member 66, 66' together, the clamping members are moved into cooperation with each other, to a position similar to that of the position illustrated in FIG. 1. The spring 84 is then moved into engagement with the clamping members. The configuration of the spring 84 and the spring receiving recess 80 (with which the spring cooperates) are dimensioned so that when the spring is moved into the recess, the spring will cooperate with the projections 82, thereby retaining the spring in the recess. With the spring 84 properly positioned, the clamping members are resiliently maintained in cooperation with each other, as shown in FIGS. 1 and 2.

With spring 84 retained on the clamping members 66, 66', the subassembly is moved into cooperation with the clamp holding portion 50. The insertion continues until the mounting openings 89 of the clamping members are moved into alignment with respective openings 64 of the clamp holding portion 50. As this alignment occurs, the insertion is discontinued, and the mounting rods are positioned in the openings 89 and the openings 64. The rods cooperate with the members 66, 66' to accurately position and maintain the members in the position shown in FIGS. 1 and 2. In this position, it is important to note that the bottom surface 70 is spaced from the bottom wall 60 of the clamp holding portion 50. This spacing allows the clamping members 66, 66' to pivot about the mounting rods 91.

With the wire clamping device 6 fully assembled, the wire clamping device can be utilized to engage and retain a portion of the wire 4 in position relative to the device 6. This will be more fully described with reference to the operation of the lead making machine.

Figure 4:
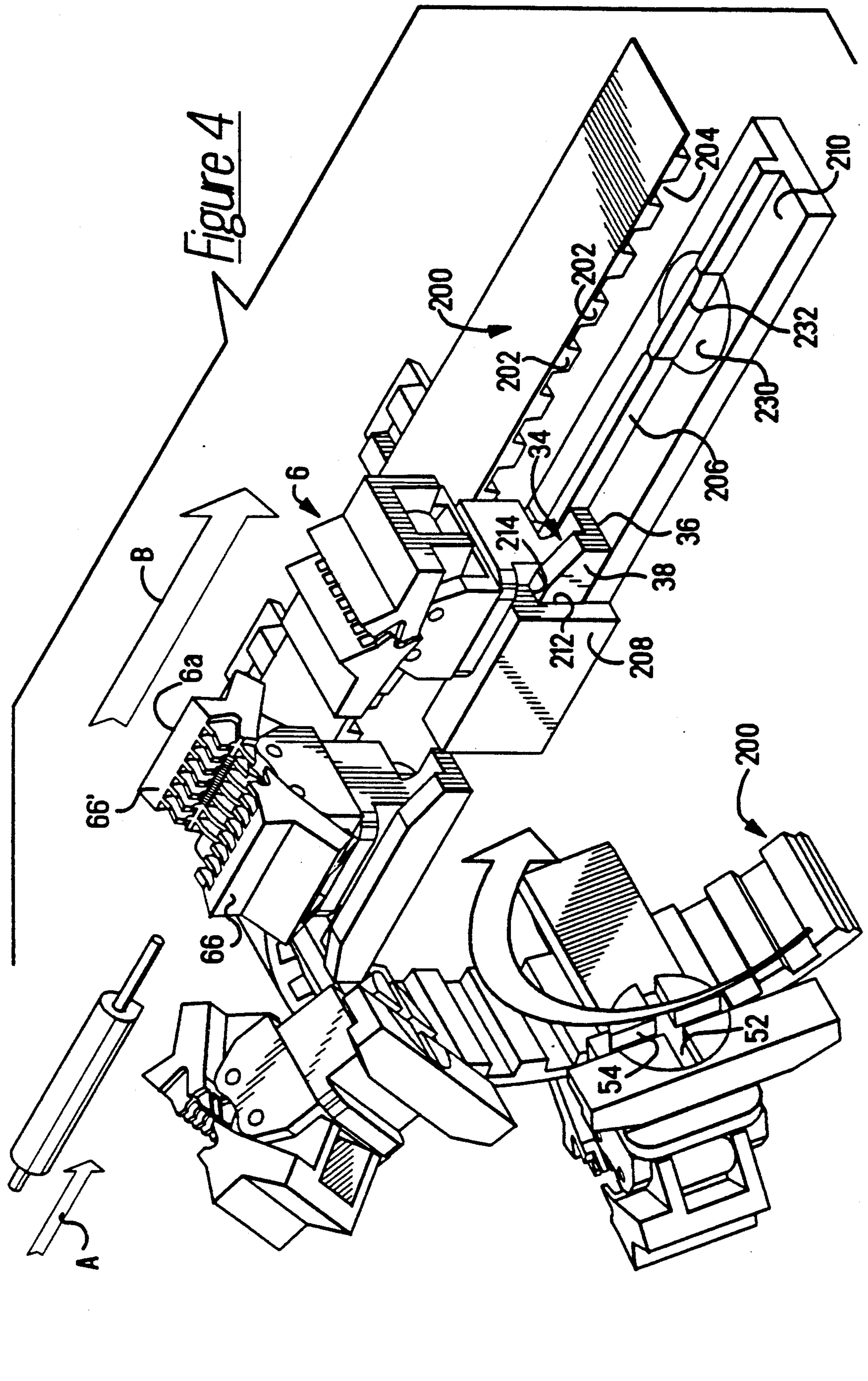
FIG. 4 is a fragmentary perspective view showing a portion of the conveyor belt of the lead making machine, with a plurality of wire clamping devices attached thereto, the Figure illustrates the simultaneous related movement of the wire and the wire clamping devices.

As illustrated in FIGS. 4 through 10, various wire clamping devices 6 cooperate with a belt 200. The belt 200 has projections 202 which extend from a surface thereof. The projections 202 are spaced from each other by recesses 204. As shown in FIG. 4, the belt 200 cooperates with the belt cooperation section 12 of each device 6 to provide the means to move the devices 6. In other words, as the belt 200 is moved (in a conventional manner), the projections 202 and recesses 204 engage respective recesses 16 and projections 14 of the devices 6, thereby causing the wire clamping devices 6 to move with the belt 200. It should be noted that the belt is manipulated by a motor (not shown) which can be engaged or disengaged as required to allow the belt to move or stop accordingly.

As the wire clamping devices 6 are moved, it is important that the movement be limited to a direction which is parallel to the movement of the belt. If other types of movement are controlled, the devices 6 can accurately control the positioning of the leads. Consequently, a track 206 and a positioning wall 208 are provided to cooperate with the wire clamping device 6.

The track 206 extends through the lead making machine, proximate belt 200. The track extends upward from a surface 210, as shown in FIGS. 4 through 9. As is illustrated in the figures, the track followers 52, 54 are positioned over the track 206. The dimensions of the track followers and track allow the wire clamping devices 6 to slide along the track in a direction which is parallel to the track. However, the cooperation of the track and track followers prevents the wire clamping devices from movement in a direction which is perpendicular to the axis of the track.

As an aid to insure for the accurate movement and precise positioning of the wire clamping devices 6, the guide and alignment members 34 cooperate with the positioning wall 208. As is shown in FIG. 4, the bottom surface 36, side surface 38, and top surface of each member 34 engages, respectively, the surface 210, side surface 212, and ledge 214 of the wall 208. This configuration prevents the wire clamping devices from tilting, while allowing the devices to move along the track.

The function of the wire clamping device 6, or other similar device, will now be described with reference to the wire feed and cutting portion 2 of the lead making machine. However, before the details for portion 2 are described, it is important to note that the speed of operation of a lead making machine is dependent on the speed at which the continuous wire is fed and cut. In other words, as most lead making machines use similar work stations, i.e. crimping, etc, and as these work stations are effective at high rates of speed, the speed of the machine is essentially limited to the speed at which the continuous wire is fed to the machine. Therefore, a wire feed and cutting portion of the machine capable of high speed manipulation is essential in order to increase the output of the lead making machine.

As shown in FIG. 4, a plurality of wire clamping devices cooperate with the belt 200 and track 206, as was previously explained. The belt 200 is one continuous member which extends through the lead making machine in the configuration of an elongated oval. The wire clamping devices are positioned adjacent to the belt, and therefore the plurality of devices also have an elongated oval configuration. The spacing provided between the wire clamping devices is dependent upon the application. However, in any particular application, the spacing provided between the devices 6 is essentially identical.

FIG. 4, as well as FIGS. 5 through 9, are meant to illustrate only a portion of the belt 200. The portion illustrated corresponds to the wire feed and cutting portion 2 of the machine. The wire clamping devices shown in the drawings are provided for purposes of illustration, and are not meant to limit the use of other devices in such a lead making machine.

Referring back to FIG. 4, the wire 4 is moved, as indicated by arrow A, toward position 2 of the machine. The wire 4 is wound around a spool (not shown) or other object which allows for a continuous feed of the wire. As the wire 4 is moved, the belt 200 and wire clamping devices 6 are moved in the direction of arrow B. It should be noted that the wire 4 and the wire clamping devices 6 are moved at essentially the same speed during this operation.

Figure 10:
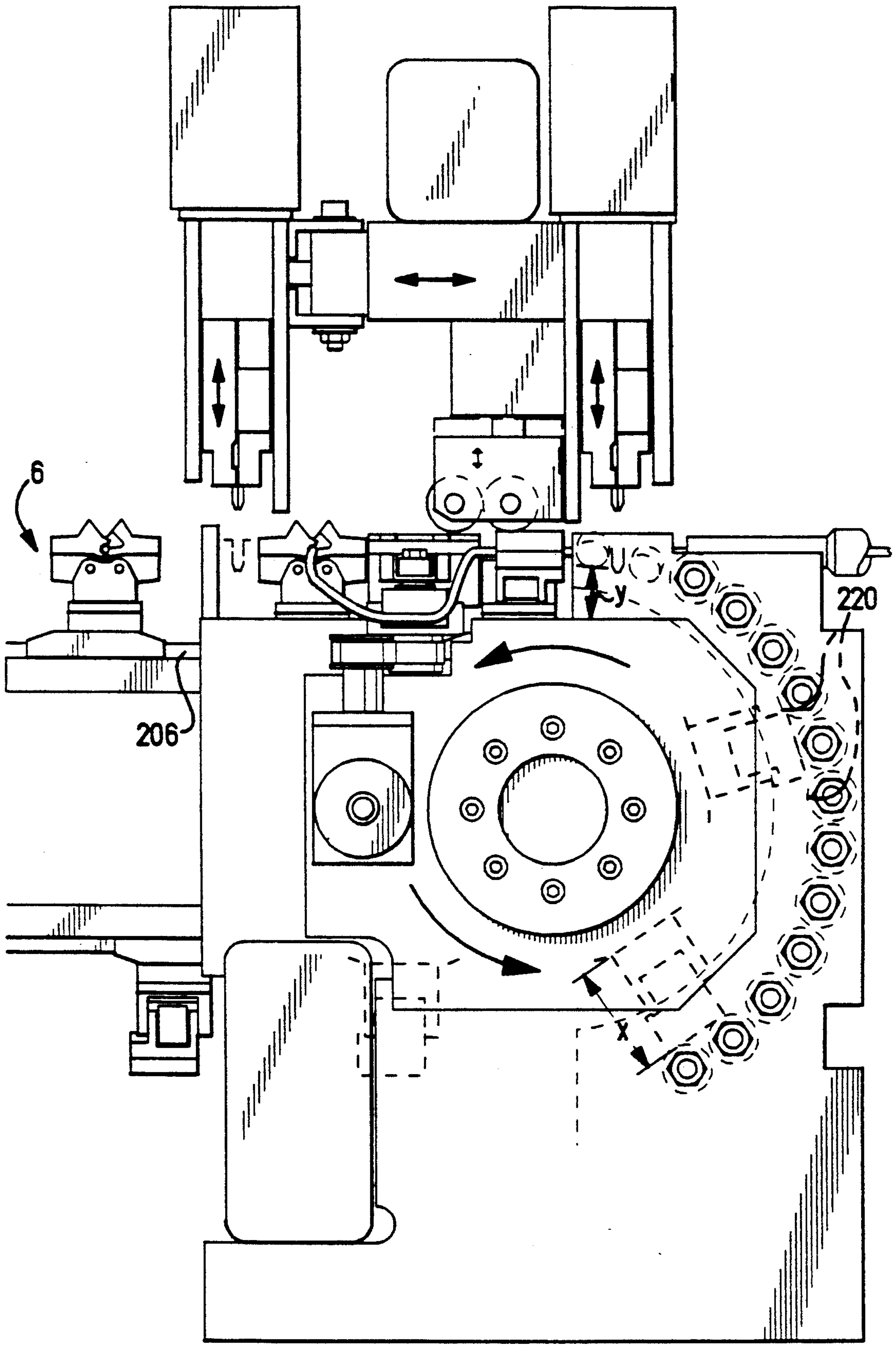
FIG. 10 is a side view of a portion of the lead making machine which is illustrated in the perspective views of FIGS. 4 through 9.

As is viewed in FIG. 4, as the wire clamping devices 6 are moved around the curved portion, the clamping members 66, 66' to be moved to the open position, a force must be applied to overcome the resiliency of spring 84. The force required is generated by rollers 220, as shown in FIG. 10. As is shown, the rollers 220 are spaced from the belt 200 a distance X when the devices 6 first engage the rollers. The distance X is essentially equal to the height of the devices between the rollers the bottom surface 36 and the flat surface 76 of the surface to surface 68. However, the rollers are positioned such that the distance the rollers 220 and the belt 200 is gradually decreased to a distance Y. Consequently, as the distance decreases, the top surfaces 68 are forced to pivot about the rods 91. This moves the clamping members 66, 66' to the open position.

The movement of the wire 4 and belt 200 are coordinated such that as the wire 4 is moved just beyond a respective wire clamping device 6 (to a position similar to that shown in FIG. 5), the clamping device is moved beyond rollers 220, thereby allowing the clamping members 66, 66' to resiliently return to the closed position. In this closed position, the wire is retained by the wire positioning surface 90 and the wire positioning recess 98, as was previously discussed. In order to accommodate the clamping of the wire, it is important that the wire be positioned at a level which corresponds to the level of the wire positioning surface 90.

Figure 5:
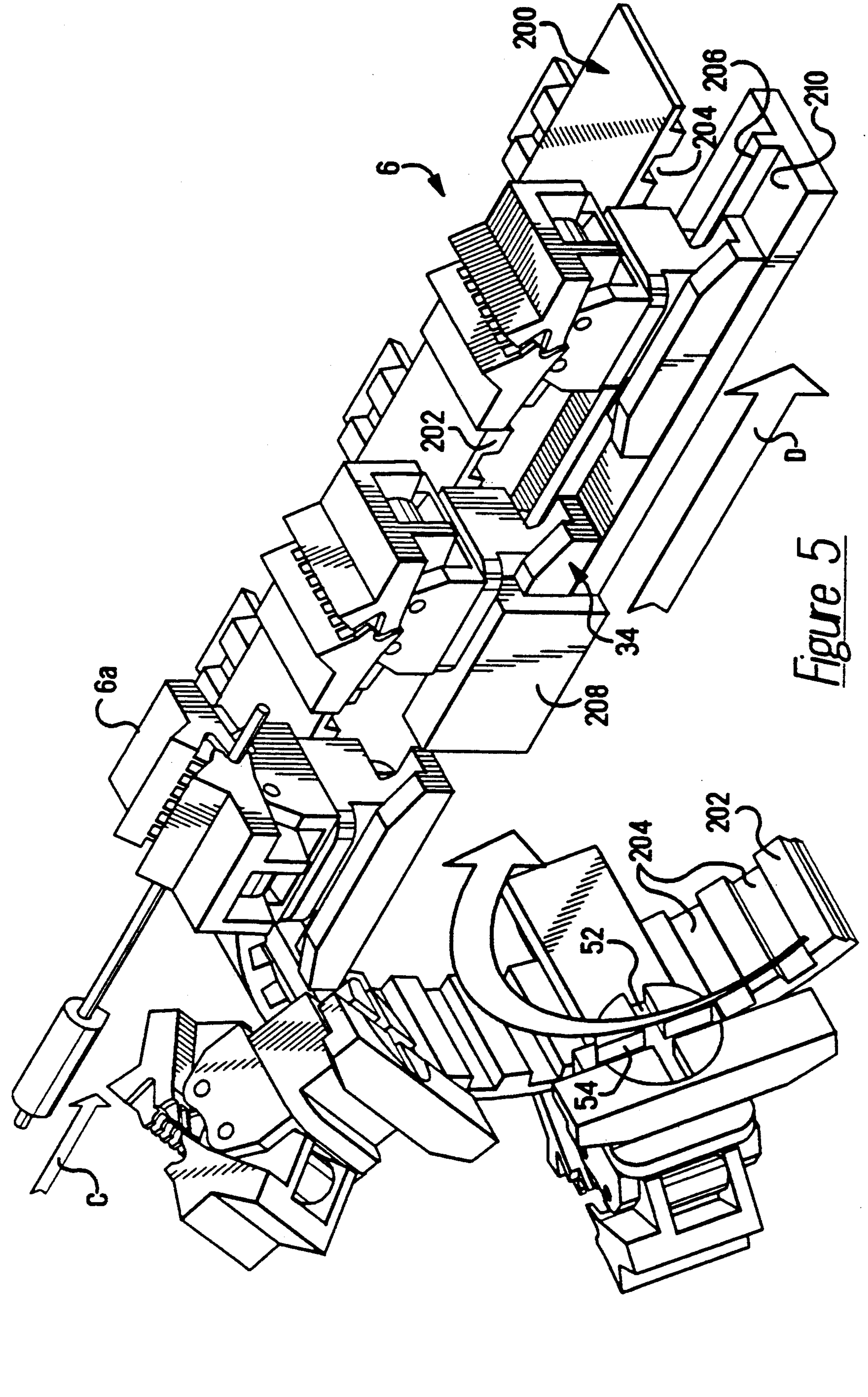
FIG. 5 is a fragmentary perspective view, similar to that of FIG. 4, illustrating the clamping of the wire in the wire clamping devices, while maintaining the related movement of each.

With the wire 4 secured in a respective wire clamping device 6, as shown in FIG. 5, the advancement of the wire and belt is continued, as indicated by the arrows C and D respectively. It is important to note that both the wire and the belt have been in continuous motion until this point.

Figure 6:
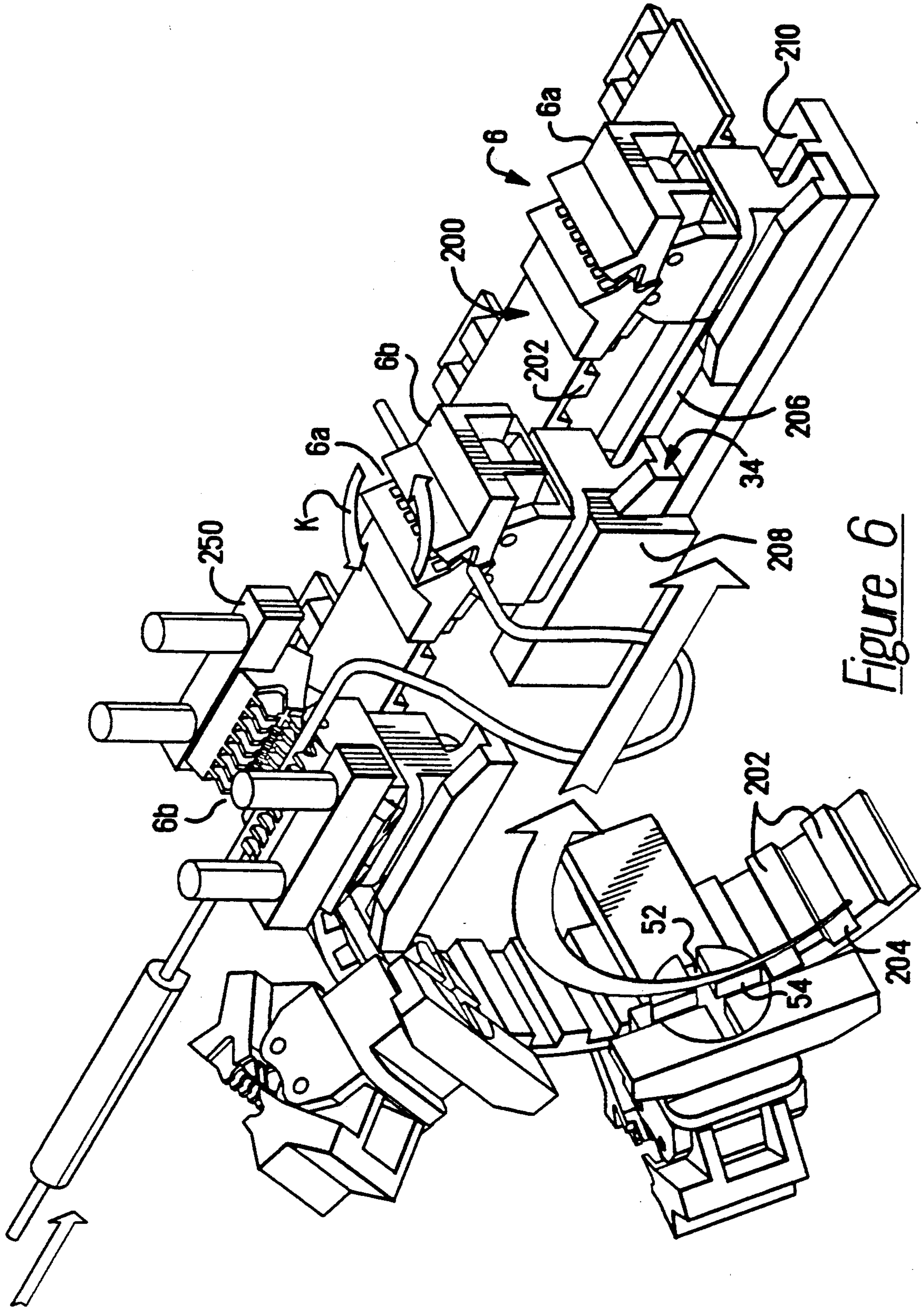
FIG. 6 is a fragmentary perspective view, similar to that of FIG. 5, illustrating the pivoting action of a respective wire clamping device, as the related motion of the wire clamping devices and the wire continues, and the feeding of a first wire lead to an appropriate length as the wire clamping device is maintained in position.

As the advancement continues, a respective wire clamping device or wire clamp 6 is moved to a rotation zone, as shown in FIG. 6. In the rotation zone, the rotational member 44 of wire clamp 6 is rotated ninety degrees, as indicated by the arrow K of FIG. 6. Consequently, the end of the lead 44 is moved from a position in which the end of the lead is positioned parallel to the track 206, to a position in which the end of the lead is positioned perpendicular to the track.

The rotation of the rotational member can be accomplished in various ways. As shown in FIG. 4, a turntable type portion 230 can be provided on a part of the track 206. In order to rotate the rotational member 44, the base member 46 is advanced along the track 206, until the turntable portion 230 is positioned directly below the base. In this position the portion of track 232 associated with portion 230 is placed in track follower 54.

When track 232 is positioned in track follower 54, the movement of the belt 200 and the wire clamping device 6 is stopped. This allows the turntable portion 230 to pivot, thereby turning the rotational member 44 of the wire clamping device 6, as previously discussed. This movement of the rotational member 44 is required to position the end of the leading position to be crimped, etc. It is conceivable that a plurality of turntable portions 230 would be provided at various locations on the track 206. The positions of portions 230 would correspond with the positioning of the work stations, such that the ends of the wires 4 would be moved to the proper position.

Another method of rotating the rotational member is not shown. In this method, some type of claw would move into engagement with the top of the wire clamping device. The claw would grip the device, such that as the claw was rotated, the device would be rotated also. In order for the claw to rotate the rotational member, a portion of the track would be removed, thereby insuring that no track is provided in either track follower as the rotation occurs. As the claw can move in line with the belt, this method allows for the continuing motion of the wire clamping devices in a direction parallel to the belt.

These are but two methods of rotating the wire clamping devices 6. Various other methods may be used with the same results.

Referring to FIG. 6, once a first wire clamping device 6*a* has been rotated, a second wire clamping device 6*b* is moved past rollers 220. However, the clamping members 66, 66' are maintained in the open position by rams 250. With rams 250 provided in position, belt 200 is stopped, insuring that wire clamping device 6*b* will remain in the open position. Although the belt and clamping device are held in place, the advancement of the wire is continued, causing the wire to form a loop, as shown in FIG. 6. This is continued until the appropriate length of wire is fed past wire clamping device 6*b* to form the lead. At this time rams 250 are lifted, allowing wire clamping device 6*b* to grip the wire. Simultaneously, the belt 200 is again advanced.

Figure 7:
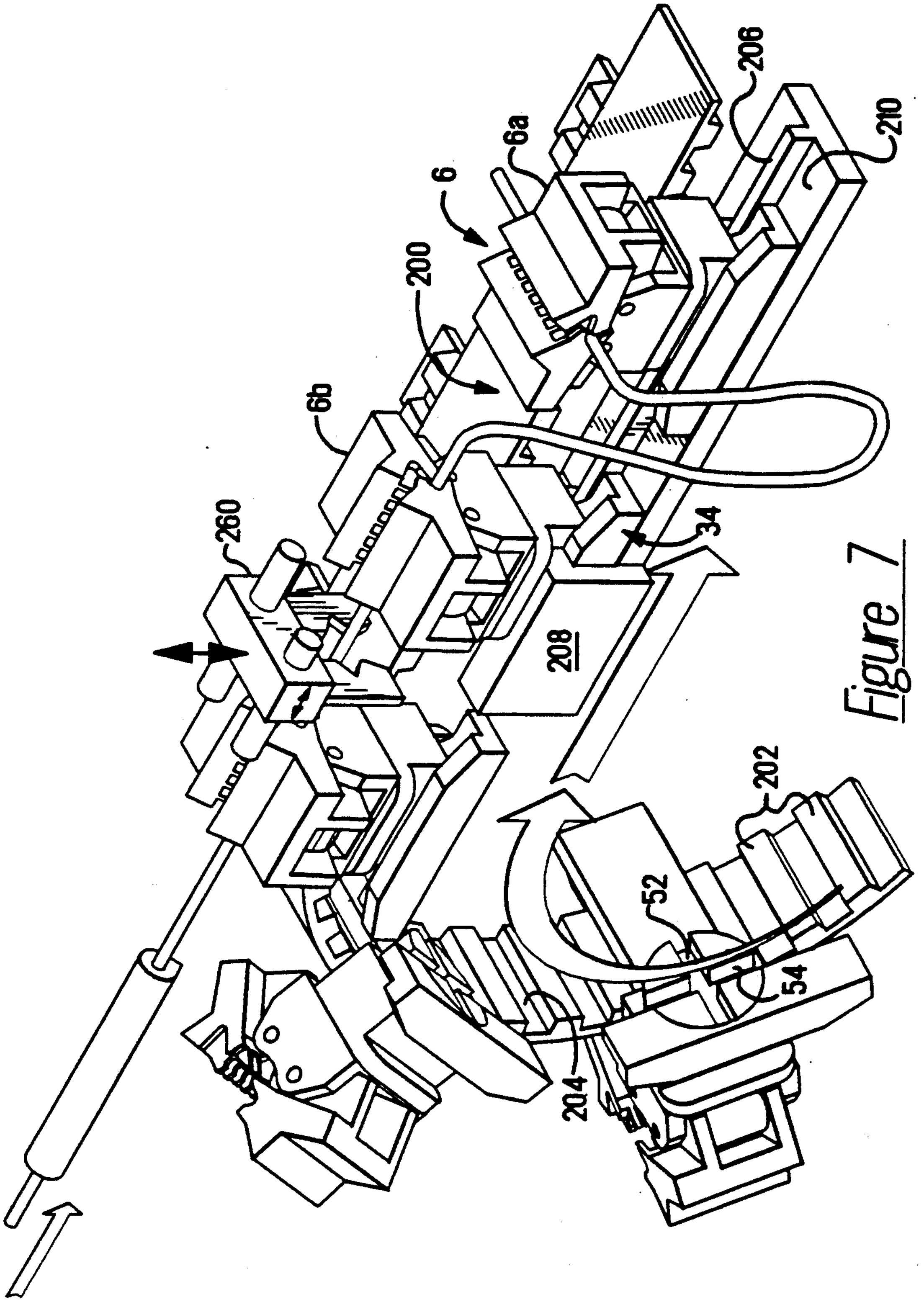
FIG. 7 is a fragmentary perspective view, similar to that of FIG. 6, illustrating a first cutting action of the wire as the related motion of the wire clamping devices and the wire continues.
Figure 8:
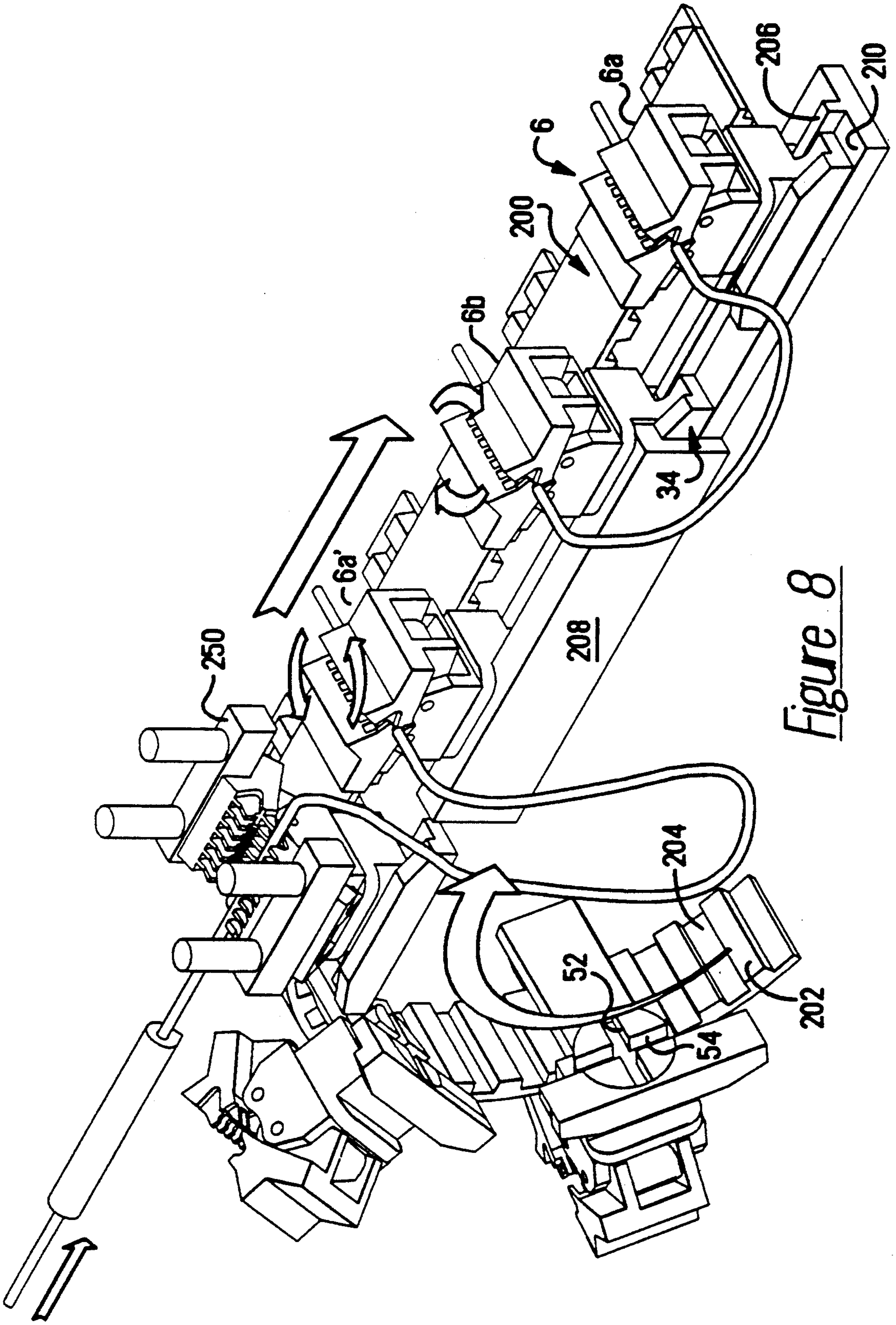
FIG. 8 is a fragmentary perspective view, similar to FIG. 6, illustrating the pivoting action of a second respective wire clamping device, and the feeding of a second wire lead to the appropriate length.

The coordinated movement of the wire 4 and belt 200 is continued, as previously described, until the wire clamping device 6*a*' is moved beyond rollers 220. As wire clamping devices 6*b* and 6*a*' are moved a wire cutting device 260 is moved downward, as shown in FIG. 7. The cutting device is closed onto the wire 4, thereby severing the wire to create separate leads. As indicated by the arrow in FIG. 7, the cutting device 260 is movable in the same direction as the belt 200. Although this movement is somewhat limited, it allows the cutting device to sever the wire as the wire and belt are in motion. Consequently, this operation does not reduce the speed of the lead making machine.

After the wire has been severed, wire clamping devices *6b* and *6a'* are rotated so that the ends of the leads are provided in the position required. It is worth noting that although the clamping devices are shown to rotate directly after the feed station, it is conceivable that the rotation will occur at a location which is distant from the feed station.

The sequence of events described above is repeated for each lead required. Therefore, as the steps are identical, the explanation will not be repeated.

Figure 9:
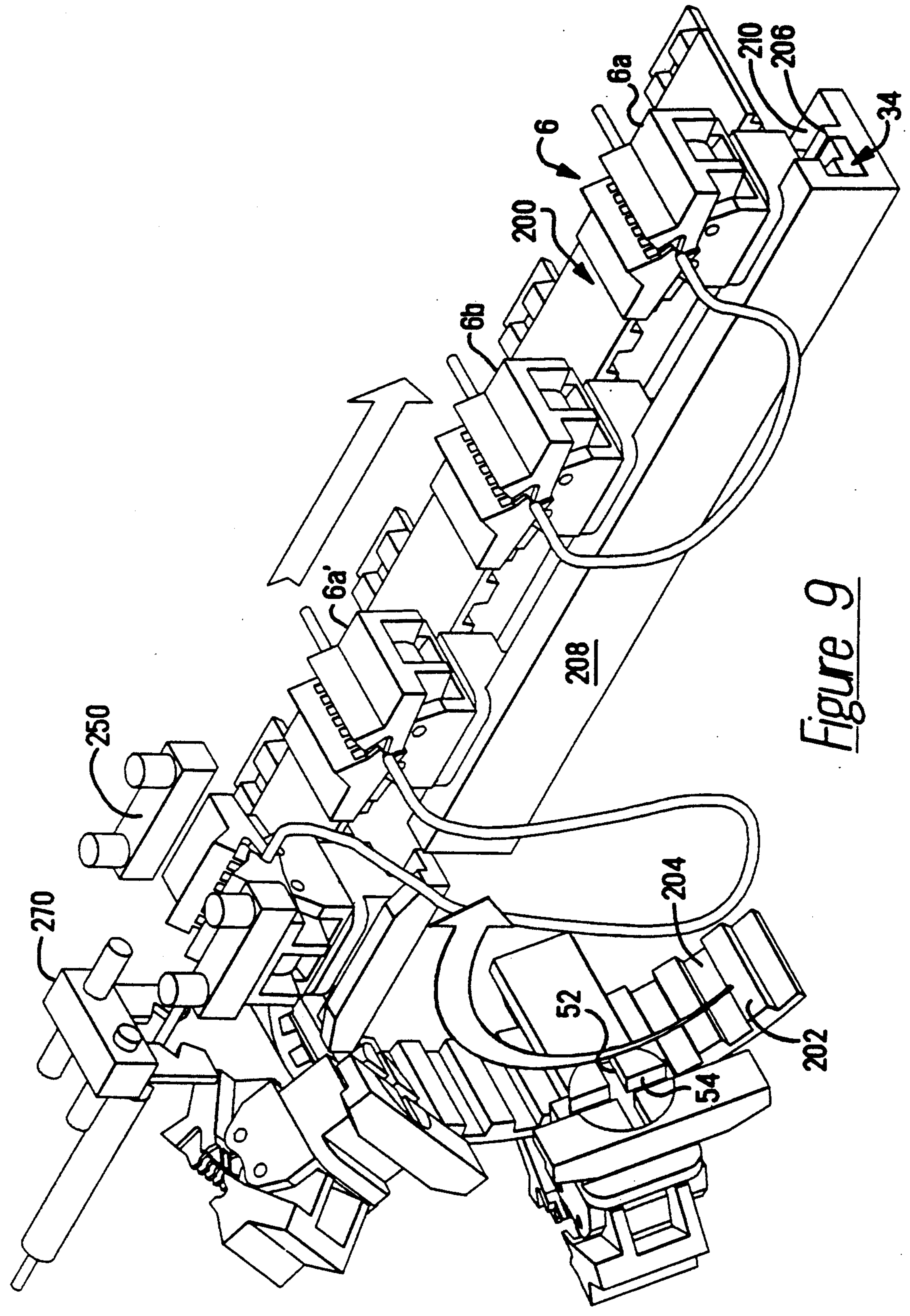
FIG. 9 is a fragmentary perspective view, similar to that of FIG. 7, illustrating a second cutting action of the wire, thereby enabling the wire diameter to be changed.

FIG. 9 illustrates the method used to cut the wire 4 prior to being fed into a wire clamping device 6. This allows various wires to be inserted into the machine. A wire cutting device 270 is moved into position adjacent the wire. The advancement of the wire is stopped and the blades of the cutting device 270 cooperate with the wire to sever the wire. Consequently, a different wire can be fed into the wire clamping device.

The use of the wire clamping device 6 and the continuous motion of the lead making machine are of great benefit. The speed of prior art lead making machines has been controlled by the speed at which the wire could be fed and cut by the wire feed and cutting station. In other words, the various crimping, etc. stations were capable of operating at a much higher rate of speed than the feed and cutting station. With the continuous feed and cutting of the wire offered by the machine of this invention, the overall speed of the machine can be increased with no other adjustment needed. This will increase production and decrease cost.

We claim:

1. A lead making apparatus for the production of a plurality of leads from a wire, the lead making apparatus comprising:

a plurality of wire gripping devices which are movable between an open position and a closed position, each of the wire gripping devices has a channel which is provided therein, the channel being dimensioned to allow the wire to be positioned and maintained therein;

wire feed means positioned proximate to the wire gripping devices, the wire feed means cooperates with the wire to advance the wire into the wire gripping devices;

drive means provided adjacent to the wire gripping devices, the drive means cooperate with the wire gripping devices to move the wire gripping devices;

a first cutting means is mounted on the lead making apparatus, the first cutting means can move in the same direction as the wire gripping devices to allow the first cutting means to sever the wire as the wire and the wire gripping means are moved, whereby the drive means moves the wire gripping devices in the same direction as the wire feed means advances the wire, such that as the wire gripping devices are moved, the wire will be advanced into the channels of the wire gripping devices.

2. A lead making apparatus as recited in claim 1 wherein opening means are provided proximate the wire feed means, the opening means cooperate with wire gripping devices as the wire gripping devices are advanced toward the wire feed means, the opening means force the wire gripping devices to be provided in the open position when the wire gripping devices are moved to the wire feed means, thereby allowing the wire to be advanced into the channels of the wire gripping devices.

3. A lead making apparatus as recited in claim 2 wherein opening means are a plurality of rollers which cooperate with surfaces of the wire gripping devices, rollers are positioned such that as the wire gripping devices positioned proximate the wire feed means, the wire gripping devices are in the open position.

4. A lead making apparatus as recited in claim 3 wherein a ram means is positioned proximate the rollers, the ram means cooperates with the wire gripping device to maintain the wire gripping device in the open position.

5. A lead making apparatus as recited in claim 1 wherein the first cutting means is provided on the lead making apparatus a distance from the wire feed means, the first cutting means is provided to sever the wire at the appropriate location to insure that the lead making apparatus will produce a plurality of individual leads.

6. A lead making apparatus as recited in claim 5 wherein a second cutting means is provided proximate the wire feed means, the second cutting means cooperates with the wire to sever the wire prior to the wire being advanced into engagement with the wire gripping devices.

7. A lead making apparatus as recited in claim 1 wherein the drive means is a belt with first projections provided thereon, the belt and first projections cooperate with an arm and second projections of the wire gripping devices to provide the means required to coordinate the movement of the wire gripping devices and the wire.

8. A lead making apparatus as recited in claim 7 wherein a track is provided which cooperates with the wire gripping devices to insure that the wire gripping devices are properly aligned in the lead making apparatus, the track extending in a direction which is essentially parallel to the belt.

9. A lead making apparatus as recited in claim 8 wherein the wire gripping devices pivot on the track of the lead making apparatus, such that the ends of the leads can be presented to various work stations provided on the lead making apparatus.

* * * * *